United States Patent [19]
Kaye

[11] 3,926,644
[45] Dec. 16, 1975

[54] TREATMENT OF ORGANIC BIODEGRADABLE MATERIALS WITH MONOCHLOROACETATE ESTERS OF CHLORINATED PHENOLS

[75] Inventor: Saul Kaye, Evanston, Ill.

[73] Assignee: Ferro-Corporation, Cleveland, Ohio

[22] Filed: Aug. 8, 1974

[21] Appl. No.: 495,563

[52] U.S. Cl. ......... 106/15 AF; 260/45.85; 424/311
[51] Int. Cl.$^2$............................................ C08J 3/20
[58] Field of Search.......... 260/45.85 R; 106/15 AF; 117/138.5; 424/311

[56] References Cited
UNITED STATES PATENTS

| | | | |
|---|---|---|---|
| 3,181,992 | 5/1965 | Michalski | 260/45.85 |
| 3,198,764 | 8/1965 | Lowes | 260/45.95 |
| 3,231,603 | 1/1966 | Hennis et al. | 260/45.85 |
| 3,251,733 | 5/1966 | Bindler et al. | 106/15 |
| 3,506,720 | 4/1970 | Model et al. | 106/15 |

*Primary Examiner*—V. P. Hoke
*Attorney, Agent, or Firm*—Milton L. Simmons; Wesley B. Taylor

[57] ABSTRACT

A treatment is disclosed for organic biodegradable, polymeric materials, such as organic synthetic resins and cellulosic materials, with monochloroacetate esters of chlorinated phenols. This treatment not only renders such materials less susceptible to degradation by microorganisms but does so without appreciable deterioration of other desirable properties of the materials such as occurs from treatment by chlorinated phenols. The ability of the monochloroacetate ester to effect such improved results is surprisingly unique and not shared by even closely related compounds, such as the dichloroacetate and trichloroacetate of chlorinated phenols.

22 Claims, No Drawings

TREATMENT OF ORGANIC BIODEGRADABLE MATERIALS WITH MONOCHLOROACETATE ESTERS OF CHLORINATED PHENOLS

BACKGROUND OF THE INVENTION

Many organic materials upon exposure to the proper moist environment, either indoors or outdoors, are subject to spoilage, defacement, rot, decay, and the like, due to their susceptibility to attack by many microorganisms. Examples of such susceptible organic biodegradable materials include polymeric materials, both natural and synthetic, wood, paper, textiles, known synthetic resin or plastic formulations, paint, paste, adhesives, as well as lubricants, soaps, cosmetics, and the like.

In order to protect such organic biodegradable, polymeric materials from attack by microorganisms, it is the practice to incorporate into such materials biostatic agents which have the ability to prevent or delay the multiplication of the damaging microorganisms. There are literally hundreds of different chemicals which may be applied to or incorporated in susceptible organic biodegradable materials of the types mentioned. Certain biostatic chemicals have acceptable preservative activity but are objectionable because they also discolor, weaken, or otherwise deteriorate the organic biodegradable materials they are intended to beneficiate. If the preservative activity of such biostatic chemicals could be retained while their damaging activity is removed or appreciably reduced, the range of usefulness of the chemicals would be greatly increased.

Chlorinated phenols are known to have biostatic activity. However, their use with materials of the type herein contemplated has not been satisfactory and only exemplifies the shortcomings just mentioned. Chlorinated phenols have the reputation of discoloring synthetic resins and plastics. Pentachlorophenol produces a strong yellow-brown color in cellulosic materials which develops on aging, weathering, or heating of the cellulosic material. Pentachlorophenol also causes severe loss of tensile strength on cotton fabrics, presumably due to the release of HCl. While pentachlorophenol laurate produces less tendering of cotton fabrics than pentachlorophenol, the laurate also has appreciably less biostatic activity.

It would, therefore, advance the art to provide a biostatic agent for organic biodegradable, polymeric materials which not only reduces the susceptibility of such materials to attack by microorganisms but which does so without appreciable deterioration of other desirable physical properties of the materials as has previously resulted from the use of chlorinated phenols.

SUMMARY OF THE INVENTION

The principal object of the present invention is to provide a biostatic agent comprising a chlorinated phenol that has the desirable combination of imparting effective biostatic activity to organic biodegradable, polymeric materials without appreciably damaging the desirable physical properties possessed by them, such as color or strength.

It has been discovered that of the general class consisting of chlorinated phenols, and aliphatic acid esters of chlorinated phenols, surprisingly only one particular substituted aliphatic acid ester, namely, the monochloroacetate of chlorinated phenol possesses the ability to accomplish the stated purpose; and that even closely related chlorinated esters of chlorinated phenols, such as the dichloro and trichloroacetates of chlorinated phenol, are not similarly useful.

It appears that it is the ester moiety of compounds of the present invention that is so significantly important. While the benzene nucleus of the compounds should contain some chlorination, that is, at least one chlorine atom, the chemical composition of the balance of the compound can be much less restricted.

In general, a biostatic agent of the present invention comprises a chlorinated, esterified phenol having an ester group consisting of: —CO—CH$_2$—Cl. Such agents include compounds of the formula:

(I) 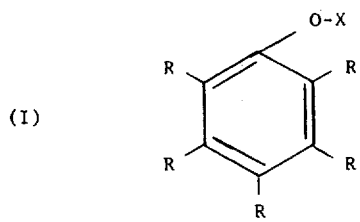

and a diester in which two benzene groups are joined as in:

(II) 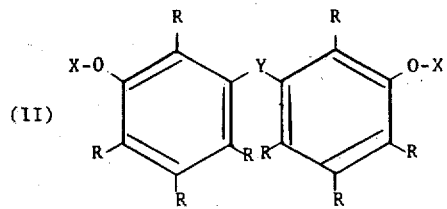

in which R is H, CH$_3$, or halogen selected from chlorine and bromine; at least one R on each benzene nucleus being halogen, and in which X is —CO—CH$_2$Cl, and Y is CH$_2$, S, or O. The preferred halogenated phenol ester is pentachlorophenol monochloroacetate.

The organic biodegradable, polymeric materials contemplated by the present invention include synthetic resinous materials, such as polyvinyl choride, polyvinyl alcohol, and acrylic and methacrylic resins, elastomers like styrene-butadiene copolymers, and cellulosic materials, whether naturally occurring as in wood, or converted, as in paper or rayon.

The biostatic agent is incorporated or applied to the organic polymeric material by conventional techniques such as by milling, in which the agent is dispersed throughout the material; or by application from a liquid medium as in the case of a textile fabric. As an example, the agent may be present in an amount of about 0.1% to about 5% by weight of the organic polymeric material, although amounts outside of this range can provide effective results.

DESCRIPTION OF THE PREFERRED EMBODIMENTS

Unlike its closely related compounds, such as pentachlorophenol and the acetate, dichloroacetate, and trichloroacetate of pentachlorophenol, monochloroacetate of chlorinated phenol has been found not only to possess biostatic activity but also not to discolor, tenderize or otherwise adversely affect the desirable physical properties of organic biodegradable, polymeric materials. While some of the chlorinated phenol salts, such as chlorinated phenol acetate, do not discolor organic polymeric materials, they also have little or no biostatic effect. Conversely, while other chlorinated phenol slats, such as chlorinated phenol trichloroacetate, do have biostatic properties, they markedly discolor some organic biodegradable, polymeric materials. The sole exception that has been discovered is chlorinated phenol monochloroacetate.

In addition, the same chlorinated phenol monoacetate alone out of a family of like compounds does not appreciably tenderize cellulosic materials such as cotton fibers. When cellulosic materials are treated with chlorinated phenol monochloroacetate, the loss of strength is minimal compared to that resulting from treatment with other chlorinated phenols of the types herein mentioned. Likewise there is little or no discoloration of the fibers by the present biostatic agents. Still other applications of the present agents are possible.

In resume, the reduction of the susceptibility of an organic, polymeric material to degradation by microorganisms without appreciably deteriorating other desirable physical properties of such material is accomplished in accordance with the present invention by treating such material with an effective amount of a biostatic agent comprising a chlorinated, esterified phenol having an ester group consisting of: —CO—CH$_2$Cl.

Considering these aspects in greater detail, the nature of the organic biodegradable, polymeric material is not critical. Many resins in bulk, film or other form are by themselves not normally defensive against bacterial growth on their surfaces. Such resinous materials include, for example, synthetic resins such as polyvinyl resins like polyvinyl chloride, polyvinyl alcohol, polyvinyl acetate, the various acrylic resins and methacrylic resins, such as polymethacrylate; polyesters and alkyds; polyolefins such as polyethylene, polypropylene, and polyisobutylene; polyurethanes; elastomers such as styrene-butadiene copolymers, and butadiene-acrylonitrile copolymers; celluloses such as methyl cellulose, ethyl cellulose; and still others. The cellulosic materials may occur naturally as in wood, wool, cotton, and the like, or be synthetically fabricated as in rayon fibers from which various fabrics, cords, ropes, etc., are formed.

Further, it is not necessary for an organic polymeric material to be in solid form to be subject to attack by bacteria. Liquid paint, for instance, contains organic polymeric materials. The known water-based latex paints are especially subject to attack by bacteria. Bacteria, even in closed containers, can cause the paint to spoil and become smelly and stringy in composition. When this happens, the paint is useless.

It is the combination of the monochloroacetic ester group —CO—CH$_2$Cl with a chlorinated phenol which produces the improved compounds of the present invention. While the ester group is unalterable, the chlorinated phenol moiety can take a variety of forms. Formulas I and II of the preceeding section indicate the range of compounds that are useful. Specific examples include: 2,4,6 trichlorophenol monochloroacetate; 3 methyl, 4 chlorophenol monochloroacetate; 2,2' methylene-bis (4-chlorophenol monochloroacetate); pentachlorophenol monochloroacetate; 2 bromophenol monochloroacetate; 2,4 dichlorophenol monochloroacetate; 2,4,5,6 tetrachlorophenol monochloroacetate; 2,3 dimethyl 4 chlorophenol monochloroacetate; 2 methyl 3,4 dichlorophenol monochloroacetate; 2,2' methylene bis (3,4,6 trichlorophenol monochloroacetate); 2,2' thiobis (4,6 dichlorophenol monochloroacetate); and the like.

The method of preparing the present biostatic agents is known in the art. The agents may be incorporated or applied to an organic biodegradable, polymer material by any convenient technique. An agent may be milled or calendared into a solid resinous material. Or the agent may be applied from a liquid medium, such as from an organic solution like mineral spirits or from an aqueous emulsion or dispersion, by dipping the organic polymeric material into the solution or dispersion; or by roller coating, spraying, or brushing, etc. As a rule, the biostatic agent is present in an amount of at least 0.1% by weight of the resinous organic polymeric material to provide a desirable degree of the beneficial effect, while more than about 5% by weight is wasteful of the agent. Amounts outside of this range can provide effective results.

The following examples are intended only to illustrate the invention and should not be construed as imposing limitations on the claims. Parts and percentages are by weight unless otherwise indicated.

EXAMPLES 1 THROUGH 10

A series of esters of pentachlorophenol was prepared as follows. A quantity of pentachlorophenol was dissolved in xylene in a reaction flask together with a stoichiometrically equivalent weight of pyridine. The temperature was raised to approximately 100°C and the stoichiometric amount of the appropriate acid chloride was slowly dripped into the flask. The mixture was stirred during the addition and for about one hour after the addition was completed. Pyridine hydrochloride, insoluble in the xylene, precipitated and was filtered off after cooling. The solvent was then evaporated under reduced pressure, resulting in precipitation of the desired product. The identity and purity of the product were checked by recrystallization and melting point determinations, or infrared spectroscopy when desired. The esters prepared in this fashion are listed in the following Table A.

The pentachlorophenol esters synthesized as above described were incorporated into flexible polyvinyl chloride films by means of a two roll laboratory mill. The polyvinyl chloride (PVC) formulation used was:

|  |  | Parts by Weight |
|---|---|---|
| Organic biodegradable material | Polyvinyl chloride | 100 |
| Primary plasticizer | Dioctyl phthalate | 40 |
| Secondary plasticizer | Epoxidized soy bean oil | 5 |
| Heat stabilizer | Dibutyl tin-bis (isooctyl thioglycolate) | 2.5 |
| Pigment | Titanium dioxide | 3 |
| Lubricant | Stearic acid | 0.5 |

The polyvinyl chloride used was purchased under the trademark "Geon 102". To this formulation was added the biostatic agent under test in the amounts indicated in Table A. After calendaring the completed formulation for 10 minutes at 320°F, a sheet measuring 0.03 inch in thickness was stripped from the mill rolls. Discs and strips were cut and punched from the sheet for the various biological challenges hereinafter described. These biological tests were standard procedures developed by Government agencies and by various manufacturers of protected polyvinyl chloride products.

In order to determine if the biostatic agent provides good performance under field conditions, the polyvinyl chloride films were exposed to a variety of simulated use conditions before subjecting them to biological challenges. These conditions include leaching in running water for 24 hours, accelerated aging at 158°F for 7 days, and exposure in a Weather-o-meter apparatus, a standard exposure device, to a carbon arc lamp and simulated rainfall for 100 hours.

The biological challenges determined (1) the susceptibility of the treated polyvinyl chloride film to support, tolerate, or prevent the growth of various fungi, chiefly *Aspergillus niger*, (2) the susceptibility of the treated film to becoming stained when an actinomycete, *Streptoverticillium reticulum*, is grown on a nutrient medium in contact with the film, (3) the presence of a zone of inhibition of bacterial growth next to the polyvinyl chloride film when it is placed upon nutrient agar seeded with the organism, *Staphylococcus aureus*, and (4) growth of a mixture of five fungi, hereinafter designated, upon samples of the film after extended periods of incubation in warm moist conditions.

To be a serviceable and practical additive for resinous formulations, a biostatic agent should not interfere with the heat-stabilization which is often imparted to a formulation by other special, known additives. Every test resin formulation was therefore exposed to a temperature of 365°F for two hours, and samples were withdrawn every 15 minutes to determine the effect of the biostatic agent on heat stability. Many chemicals with biostatic activity may show no discoloration when first incorporated with other ingredients and heated on the mill for 10 minutes, but they may well produce off-colors of yellow or brown upon heating, weathering, or accelerated aging, and therefore really have no practical use in organic biodegradable, polymeric formulations. This is the case, for example, with pentachlorophenol as well as with some of its esters. Pentachlorophenol itself, therefore, has found little or no application in the preservation of resins like polyvinyl chloride.

In comparing the biostatic activities, and the effect of the various phenol esters upon the heat and weather-stability of the polyvinyl chloride films, the esters were not added at equal concentrations but at concentrations stoichiometrically equivalent to 0.8 parts of pentachlorophenol per 100 parts of resin. Table A lists the results of the tests.

TABLE A

Biostatic and Discoloration Activity of Pentachlorophenol and Esters

| Example | Agent | Concentration phr | Biostatic Activity | Discolors in Heat or Weather |
|---|---|---|---|---|
| 1 | PCP Technical Grade | 0.80 | Yes | D |
| 2 | PCP 99+% pure | 0.80 | Yes | D |
| 3 | PCP acetate | 0.93 | No | C |
| 4 | PCP propionate | 0.98 | No | C |
| 5 | PCP butyrate | 1.01 | No | C |
| 6 | PCP laurate | 1.27 | No | C |
| 7 | PCP 3,4 dichlorobenzoate | 1.33 | No | C |
| 8 | PCP monochloroacetate | 1.03 | Yes | C |
| 9 | PCP dichloroacetate | 1.15 | Yes | D |
| 10 | PCP trichloroacetate | 1.24 | Yes | D |

In Table A, "PCP" means pentachlorophenol; "phr" means parts by weight of agent per 100 parts of polyvinyl chloride resin in the formulation; "Yes" means resistance to all of the four types of biological challenge previously described; "No" means no resistance to these biological agents; "D" means discoloration after heating at 365°F; and "C" means no discoloration after heating at 365°F. The technical grade of pentachlorophenol was purchased under the trademark "Dowicide 7".

It is emphasized that pentachlorophenol monochloro acetate (Example 8) does not discolor the polyvinyl chloride film on heating or on weathering in the laboratory. Yet it possesses biostatic activity that is quite similar to that of the pentachlorophenol itself. All other esters tested discolored the film if they had biostatic activity, or if they did not discolor the film, such other esters showed no significant biostatic activity.

EXAMPLES 11 THROUGH 17

Cotton, other natural fibers, and some synthetic ones are rapidly deteriorated by fungi when exposed under warm moist conditions. Fabrics made of cotton or blends containing cotton therefore require treatment with preservative chemicals when there is the likelihood of outdoor use or of use under any conditions where mold may develop. The requirement exists even when the fabric is to be coated with polymeric films such as polyvinyl chloride.

In order to evaluate the protective activity of pentachlorophenol and some of its esters, 1.5% by weight solutions were prepared in mineral spirits, and strips of Cotton Army Duck were immersed in these solutions for one hour. The fabrics were padded and allowed to air dry at room temperature, after being weighed to determine the amount of chemical added. Subsequent to this, the fabric samples were exposed for 100 hours in a Weather-o-meter apparatus using a carbon arc lamp. The fabrics were then examined and their tensile strengths ascertained by a Dillon Universal Tester, Model M, to determine if the chemical treatment caused any discoloration or "tenderizing" of the fabric. The samples were then contaminated with a mixture of five cellulolytic fungi, namely, *Chaetomium globosum*, *Trichoderma*, *Penicillium funiculosum*, *Aspergillus niger*, *Aspergillus flavus*, and the extent of fungal growth determined after four weeks of incubation. Table B lists the results.

In Table B, "PCP", "Yes", and "No" have the same meanings as in Table A. The indicated "Color" is based on a scale in which "0" represents white (control) and "10" represents tan. In Table B there is the same phenomenon previously observed, namely, that the monochloroacetic acid ester of pentachlorophenol (Example 15) causes the least discoloration and the least damage to cotton fabric of all the esters tested and has, in addition, activity as a biostatic agent. In contrast, pentachlorophenol laurate (EXAMPLE 14) which is commercially sold as a fungicide for cotton fabrics, produced the greatest color upon weathering, as well as the greatest tendering effect (loss of strength).

EXAMPLES 19 THROUGH 29

Since the monochloroacetic acid ester of pentachlorophenol possesses unique activity and lack of damage among all of the esters tested, it was considered important to prepare and test the monochloroacetic acid esters of other chlorinated phenols, known to have some preservative activity, to see if the same phenomenon could be observed. Accordingly, using the general method of preparation described previously, the chloroacetic acid esters of the following chlorinated phenols were synthesized: p-chloro-m-xylenol; p-chloro m-cresol; 2,4,6 trichlorophenol; 2,2' dihydroxy 5,5'

TABLE B

Pentachlorophenol and Esters Used to Treat Cotton Fabric

| Example | Compound | Weight % on Fabric | Fabrics weathered 100 hours | | Fungal Resistance (4 weeks) |
|---|---|---|---|---|---|
| | | | Color | Tensile strength, % of untreated fabric | |
| 11 | None | 0 | 0 | 100 | No |
| 12 | Pentachlorophenol 99+% | 1.2 | 7 | 47 | Yes |
| 13 | PCP acetate | 1.3 | 2 | 79 | No |
| 14 | PCP laurate | 1.6 | 10 | 34 | Yes |
| 15 | PCP monochloroacetate | 1.2 | 0 | 83 | Yes |
| 16 | PCP dichloroacetate | 1.2 | 3 | 53 | Yes |
| 17 | PCP trichloroacetate | 1.2 | 2 | 64 | Yes |

EXAMPLE 18

A sample of a white semi-gloss latex paint was procured from a manufacturer without preservative chemicals which are usually incorporated. Such water-based paints are susceptible to two types of microbiological damage if not protected by preservatives. Bacteria can multiply within the can, causing spoilage, and fungi can grow on the painted surface itself.

Pentachlorophenol and its monochloroacetate ester were added to portions of the paint in various quantities ranging from 0.5% by weight to 3%. The paint samples were ball milled with the additives for 12 hours, and then applied to strips of filter paper to provide test surfaces for microbiological challenge. The painted surfaces were exposed to a Hanovia Alpine ultra-violet light at a distance of 8 inches for 3 hours at room temperature. There was a noticeable difference in the color of samples exposed to the ultra-violet radiation. The pentachlorophenol-containing painted surfaces acquired a yellow-brown cast, while the monochloro ester-containing surfaces remained white.

Both sets of irradiated painted paper samples were placed upon mineral salts agar surfaces and contaminated by spraying with the mixture of fungal spores used in Examples 11 to 17. Paper which had not been painted, as well as paper painted with the untreated, unprotected paint were similarly contaminated. At the end of two weeks of incubation at 28° to 30°C and 85 to 95% relative humidity, the papers were examined. Unpainted paper and unprotected painted paper had developed fungal growth. Papers painted with paint containing pentachlorophenol or its monochloroacetic acid ester developed only 5 to 10% as much surface fungal growth.

dichloro diphenyl methane (dichlorophene).

Dichlorophene is one of the most effective and most popular compounds available for the preservation of cotton and other fabrics. A series of tests was therefore undertaken to determine if the chloroacetic acid esters could provide any advantage and to compare the activity of the pentachlorophenol chloroacetic acid ester with these other chlorinated phenols and their esters.

Accordingly, solutions of these phenols and their esters were prepared, in spirits of turpentine, and cotton fabrics soaked in these solutions for 0.5 hour, followed by padding and air drying at room temperature. The amount of chemical added to the fabric was determined by weighing after padding and then calculating the dry "add-on". All the phenols were used at 1.5% concentration by weight; their esters were used in quantities which were equivalent to 1.5% phenol.

The fabrics were then weathered in a Weather-o-meter apparatus for 100 hours, examined and given color ratings. All samples were then leached in running water for 24 hours. A portion was reserved for measuring tensile strengths on a Dillon Universal Tester, Model M. The remaining portion was exposed to cellulolytic fungi for two weeks, either in a soil burial bed or in an incubator where they were contaminated with the five fungal species previously stated for Examples 11 through 17 and incubated for 2 weeks at 30°C. The fabric samples were then removed, the extent of fungal growth measured, and all were equilibrated to 50% Relative Humidity and 70°F. The tensile strengths of these fungus-exposed samples were then measured. Results are presented in Table C.

In Table C, "MCA" means monochloroacetate ester; the "Extent" of fungal growth is on a scale of 0 to 4 in which "0" represents no growth and "4" represents fungal growth on 60 to 100% of available surface area; and the "Color" is on a scale of 0 to 10 as described for Table B.

From the data presented in Table C, the unexpected result of the present invention is again shown. The monochloroacetate esters of chlorinated phenols cause far less discoloration of cotton fabric than do the chlorinated phenols. This improvement in color is not accompanied by any significant lessening of biostatic activity. In the case of pentachlorophenol, the monochloroacetic ester has significantly less tendering effect upon the cotton fabric after weathering. And with all the phenols, the fabric loses less strength due to the growth and celluloytic activity of fungi when it was treated with the monochloroacetic ester as compared to when it was treated with the unesterified chlorinated phenol.

damaging than the present chlorinated phenol and to have useful antimicrobial activity when incorporated into a number of susceptible organic biodegradable, polymeric materials. The foregoing uses and applications of the present biostatic agents are intended to be only by way of examples. Still other applications for agents include use with adhesives, sizings, glues, coatings, gums, leather, wool, rayon, cutting oils and coolants, tarpaulins, awnings, clothing, wooden structures, wood pulp, paper, rubber, and the like. The present biostatic agents are uniquely adapted to treat clothing containing both natural and synthetic organic biodegradable materials, such as men's shirts woven from both cotton and polyester fibers.

TABLE C

Exposure of Cotton Fabric to Chlorinated Phenols and Their Chloroacetic Acid Esters

| Example | Compound | Grams/100 grams Turpentine | Percent add-on | Color | Tensile Strength % of Control | Fungal Exposure Two Weeks | |
|---|---|---|---|---|---|---|---|
| | | | | | | Extent | Tensile Strength % of Same Treatment Without Fungus |
| 19 | None | 0 | 0 | 0 | 100 | 4 | 26 |
| 20 | Pentachlorophenol | 1.5 | 1.3 | 7 | 35 | 1 | 63 |
| 21 | Pentachlorophenol MCA | 1.9 | 1.7 | 2 | 61 | 0 | 88 |
| 22 | p-chloro-m-cresol | 1.5 | 1.3 | 6 | 67 | 4 | 20 |
| 23 | p-chloro-m-cresol MCA | 2.5 | 2.2 | 3 | 57 | 4 | 40 |
| 24 | p-chloro-m-xylenol | 1.5 | 1.3 | 5 | 69 | 3 | 36 |
| 25 | p-chloro-m-xylenol MCA | 2.4 | 2.0 | 2 | 52 | 4 | 37 |
| 26 | dichlorophene | 1.5 | 1.3 | 8 | 86 | 3 | 47 |
| 27 | dichlorophene di-MCA | 2.5 | 2.0 | 2 | 81 | 1 | 82 |
| 28 | 2,4,6 trichlorophenol | 1.5 | 1.3 | 3 | 73 | 4 | 50 |
| 29 | 2,4,6 trichlorophenol MCA | 2.2 | 1.9 | 1 | 62 | 4 | 57 |

EXAMPLES 30 THROUGH 36

Pieces of paper towelling, chip-board, and small billets of white pine wood were soaked at room temperature in the turpentine solutions listed in Table D for 0.5 hour.

TABLE D

| Example | Turpentine Solution |
|---|---|
| 30 | Control, turpentine only |
| 31 | 1.5% pentachlorophenol |
| 32 | 1.9% pentachlorophenol monochloroacetate |
| 33 | 1.5% dichlorophene |
| 34 | 2.5% dichlorophene di (monochloroacetate) |
| 35 | 2,4,6 trichlorophenol |
| 36 | 2,4,6 trichlorophenol monochloroacetate |

Samples were dried overnight at room temperature and then exposed to a Hanovia ultra-violet light held 8 inches above the samples. In 0.5 hour, the material treated with the solutions of Examples 31, 33 and 35 were yellow, while that of the other four samples were still white. At the end of two hours of ultra-violet exposure, the material of Examples 31, 33 and 35 were tan in color, while that of Examples 30, 32, 34 and 36 was just slightly off-white. After three hours of exposure, both the pine billets and the chip board samples of Examples 31, 33 and 35 had yellowed and darkened, while those of Examples 30, 32, 34 and 36 were still just slightly off-white.

The monochloroacetic acid ester of pentachlorophenol and of other chlorinated phenols comprising the present biostatic agents have been shown to be less In addition to ultra-violet radiation such as sunlight, there are other physical forces which are capable of degrading organic polymeric materials alone or treated with chlorinated phenols. These forces include all kinds of radiation in a wide range of wavelengths, such as heat, visible and ultra-violet radiation, and combinations of these, such as occur during weathering processes, as well as still other radiation like X-rays, gamma rays, etc. The agents of the present invention are useful in mitigating damage which can be caused by the effects of such radiations upon materials biologically protected with chlorinated phenols.

Although the foregoing describes several preferred embodiments of the present invention, it is understood that the invention may be practiced in still other forms within the scope of the following claims.

I claim:

1. In the combination of an organic biodegradable polymeric material and a biostatic agent comprising a chlorinated phenol normally adversely affecting desirable properties of said material, the improvement comprising a biostatic amount of a biostatic agent consisting essentially of a chlorinated, esterified phenol selected from the group consisting of a 2,2' methylene bis (ester of chlorinated phenol) and an ester of chlorinated phenol in which each ester group consists of —OCOCH$_2$Cl, said agent being adapted to reduce the susceptibility of said material to degradation by microorganisms without appreciably deteriorating other desirable physical properties of the material.

2. The combination of claim 1 in which said biodegradable, polymeric material includes a synthetic resin.

3. The combination of claim 1 in which said biodegradable, polymeric material is polyvinyl chloride.

4. The combination of claim 1 in which said biodegradable, polymeric material includes a cellulosic material.

5. The combination of claim 1 in which said biodegradable, polymeric material is cotton.

6. The combination of claim 1 in which said biodegradable, polymeric material is paint.

7. The combination of claim 1 in which said biostatic agent is present in an amount of about 0.1% to about 5% by weight of said material.

8. The combination of claim 1 in which said biostatic agent consists essentially of:

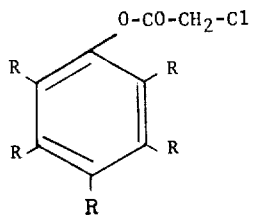

in which R is H, CH₃ or chlorine, at least one R being chlorine.

9. The combination of claim 1 in which said biostatic agent consists essentially of:

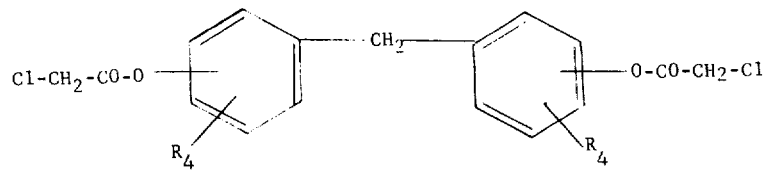

in which R is H, CH₃ or chlorine, at least one R on each benzene nucleus being chlorine.

10. The combination of claim 1 in which said biostatic agent is pentachlorophenol monochloroacetate.

11. The process for reducing the susceptibility of an organic biodegradable, polymeric material to degradation by microorganisms without appreciably deteriorating other desirable physical properties of such material, comprising: treating said material with a biostatic amount of a biostatic agent consisting essentially of a chlorinated, esterified phenol selected from the group consisting of a 2,2' methylene bis (ester of chlorinated phenol) and an ester of chlorinated phenol in which each ester group consists of —OCOCH₂Cl.

12. The process of claim 11 in which said biodegradable, polymeric material includes a synthetic resin.

13. The process of claim 11 in which said biodegradable, polymeric material is polyvinyl chloride.

14. The process of claim 11 in which said biodegradable, polymeric material includes a cellulosic material.

15. The process of claim 11 in which said biodegradable, polymeric material is cotton.

16. The process of claim 11 in which said biodegradable, polymeric material is paint.

17. The process of claim 11 in which said biostatic agent is present in an amount of about 0.1% to about 5% by weight of said material.

18. The process of claim 11 in which said biostatic agent is pentachlorophenol monochloroacetate.

19. The process of claim 11 in which said biodegradable, polymeric material is a synthetic resin, and said biostatic agent is dispersed within said resin.

20. The process of claim 11 in which treating said material includes applying said biostatic agent to said biodegradable, polymeric material from a liquid medium containing the agent.

21. The process of claim 11 in which said biostatic agent consists essentially of:

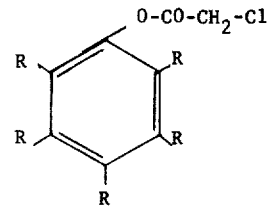

in which R is H, CH₃ or chlorine, at least one R being chlorine.

22. The process of claim 11 in which said biostatic agent consists essentially of:

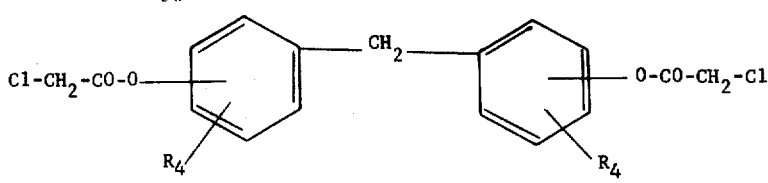

in which R is H, CH₃ or chlorine, at least one R on each benzene nucleus being chlorine.

* * * * *